(12) United States Patent
Patil et al.

(10) Patent No.: US 12,416,221 B2
(45) Date of Patent: Sep. 16, 2025

(54) METHOD FOR DOWNHOLE SEQUESTRATION OF CARBON DIOXIDE IN THE FORM OF GAS HYDRATE

(71) Applicant: SAUDI ARABIAN OIL COMPANY, Dhahran (SA)

(72) Inventors: Pramod Dhanaji Patil, Sugar Land, TX (US); Abdulaziz Qasim, Dammam (SA); Muhammad Almajid, Qatif (SA); Zuhair A. Al-Yousef, Saihat (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/429,107

(22) Filed: Jan. 31, 2024

(65) Prior Publication Data
US 2025/0243731 A1    Jul. 31, 2025

(51) Int. Cl.
*E21B 41/00* (2006.01)
*C09K 8/504* (2006.01)
*E21B 36/00* (2006.01)
*E21B 37/06* (2006.01)
*E21B 47/00* (2012.01)

(52) U.S. Cl.
CPC ........ *E21B 41/0064* (2013.01); *C09K 8/5045* (2013.01); *E21B 36/00* (2013.01); *E21B 37/06* (2013.01); *E21B 47/006* (2020.05)

(58) Field of Classification Search
None
See application file for complete search history.

(56) References Cited

U.S. PATENT DOCUMENTS

| | | | |
|---|---|---|---|
| 5,261,490 A * | 11/1993 | Ebinuma | E21B 43/01 166/57 |
| 6,285,014 B1 | 9/2001 | Beck et al. | |
| 2005/0121200 A1* | 6/2005 | Sivaraman | C01B 32/50 166/370 |
| 2010/0163231 A1* | 7/2010 | Balczewski | E21B 43/24 166/57 |

(Continued)

FOREIGN PATENT DOCUMENTS

| | | |
|---|---|---|
| CN | 107120098 A | 9/2017 |
| CN | 115573690 A | 1/2023 |
| WO | 2016/130916 A1 | 8/2016 |

OTHER PUBLICATIONS

Hoteit, Hussein et al., "Assessment of CO2 Injectivity During Sequestration in Depleted Gas Reservoirs"; Geosciences; vol. 9, Issue 5, Article 199; pp. 1-19; May 2019 (19 pages).

(Continued)

*Primary Examiner* — Andrew Sue-Ako
(74) *Attorney, Agent, or Firm* — Osha Bergman Watanabe & Burton LLP

(57) ABSTRACT

Described is a method for downhole sequestration of carbon dioxide. A heating assembly is lowered into a wellbore within a geological formation. Carbon dioxide is injected into the wellbore and heated to a predetermined temperature using the heating assembly. The heated carbon dioxide is allowed to migrate from the wellbore into the geological formation for permanent storage. A monitoring operation is performed to detect the formation of gas hydrates within the wellbore.

16 Claims, 7 Drawing Sheets

(56) References Cited

U.S. PATENT DOCUMENTS

| | | | | |
|---|---|---|---|---|
| 2010/0243245 A1* | 9/2010 | Khinkis | .................. | E21B 36/02 |
| | | | | 166/260 |
| 2010/0323928 A1* | 12/2010 | Kvamme | ................ | C01B 32/50 |
| | | | | 423/437.1 |
| 2011/0029273 A1* | 2/2011 | Lovell | .................... | G01K 7/023 |
| | | | | 703/10 |
| 2012/0012321 A1* | 1/2012 | Wallmann | ............. | E21B 43/164 |
| | | | | 166/305.1 |
| 2012/0132425 A1 | 5/2012 | Kim et al. | | |
| 2016/0265325 A1 | 9/2016 | Sharma et al. | | |
| 2021/0222509 A1* | 7/2021 | Fripp | .................. | E21B 33/1208 |

OTHER PUBLICATIONS

Simmister, Nick, "Low Carbon Barrels"; Cavitas Energy Limited; <http://www.the-tlb.com/documents/2023/9%20Cavitas%20Energy%20-%20THOR.pdf>; Accessed Jan. 31, 2024 (8 pages).

* cited by examiner

METHOD FOR DOWNHOLE SEQUESTRATION OF CARBON DIOXIDE IN THE FORM OF GAS HYDRATE

BACKGROUND

Natural gas hydrates are crystalline compounds formed from water and gas under certain thermobaric conditions. The sequestration of carbon dioxide ($CO_2$) in naturally occurring gas hydrate formation reservoirs provides an opportunity to store the $CO_2$ permanently in the reservoir. Sequestering of $CO_2$ in the subsurface by forming a gas hydrate in the porous media has significant advantages in terms of storing $CO_2$ in the reservoir.

The process of gas hydrate formation in the subsurface and its applicability in sequestering $CO_2$ has been captured extensively in the literature. Gas hydrates have been proposed as a potential technology for a number of applications, such as separation of gas mixtures, $CO_2$ capture, transportation, sequestration, methane storage and transport, and desalination. $CO_2$ may be injected in an aquifer or methane hydrate reservoir for sequestration in the form of $CO_2$ gas hydrates or mixed $CO_2/CH_4$ gas hydrates.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for downhole sequestration of carbon dioxide. At least one heating assembly is lowered into a wellbore within a geological formation. Carbon dioxide is injected into the wellbore and heated to a predetermined temperature using the at least one heating assembly. The heated carbon dioxide is allowed to migrate from the wellbore into the geological formation for permanent storage. At least one monitoring operation is performed to detect the formation of gas hydrates within the wellbore.

In another aspect, a heated fluid is injected into the wellbore prior to injecting the carbon dioxide, where the heated fluid is heated by the at least one heating assembly.

In another aspect, the heated fluid is water.

In another aspect, the predetermined temperature ranges from about 100° C. to about 200° C.

In another aspect, at least one hydrate inhibitor is injected into the wellbore.

In another aspect, the at least one hydrate inhibitor is at least one of a thermodynamic hydrate inhibitor and a kinetic hydrate inhibitor.

In another aspect, at least one solvent is injected into the wellbore.

In another aspect, the at least one solvent is at least one of an aqueous monoalcohol, an oxygenated monoalcohol, and a polyglycol.

In another aspect, dissociation of gas hydrates within the wellbore is monitored.

In another aspect, a plurality of temporary hydrate destabilization zones are created near the wellbore due to dissociation of gas hydrates.

In another aspect, when formation of gas hydrates in the wellbore is detected, a temperature within the wellbore is increased using the at least one heating assembly.

In another aspect, injectivity of the heated carbon dioxide into the geological formation is monitored.

In another aspect, the at least one heating assembly is lowered near one or more perforations in the wellbore.

In another aspect, the at least one heating assembly comprises a mechanical heating element.

In another aspect, at least one additional heating assembly is lowered into the wellbore.

In another aspect, heated water and a thermodynamic hydrate inhibitor are injected into the wellbore prior to injecting the carbon dioxide.

In another aspect, heated water and a kinetic hydrate inhibitor are injected into the wellbore prior to injecting the carbon dioxide.

Other aspects and advantages of the claimed subject matter will be apparent from the following description and the appended claims.

DETAILED DESCRIPTION

Figure 1:
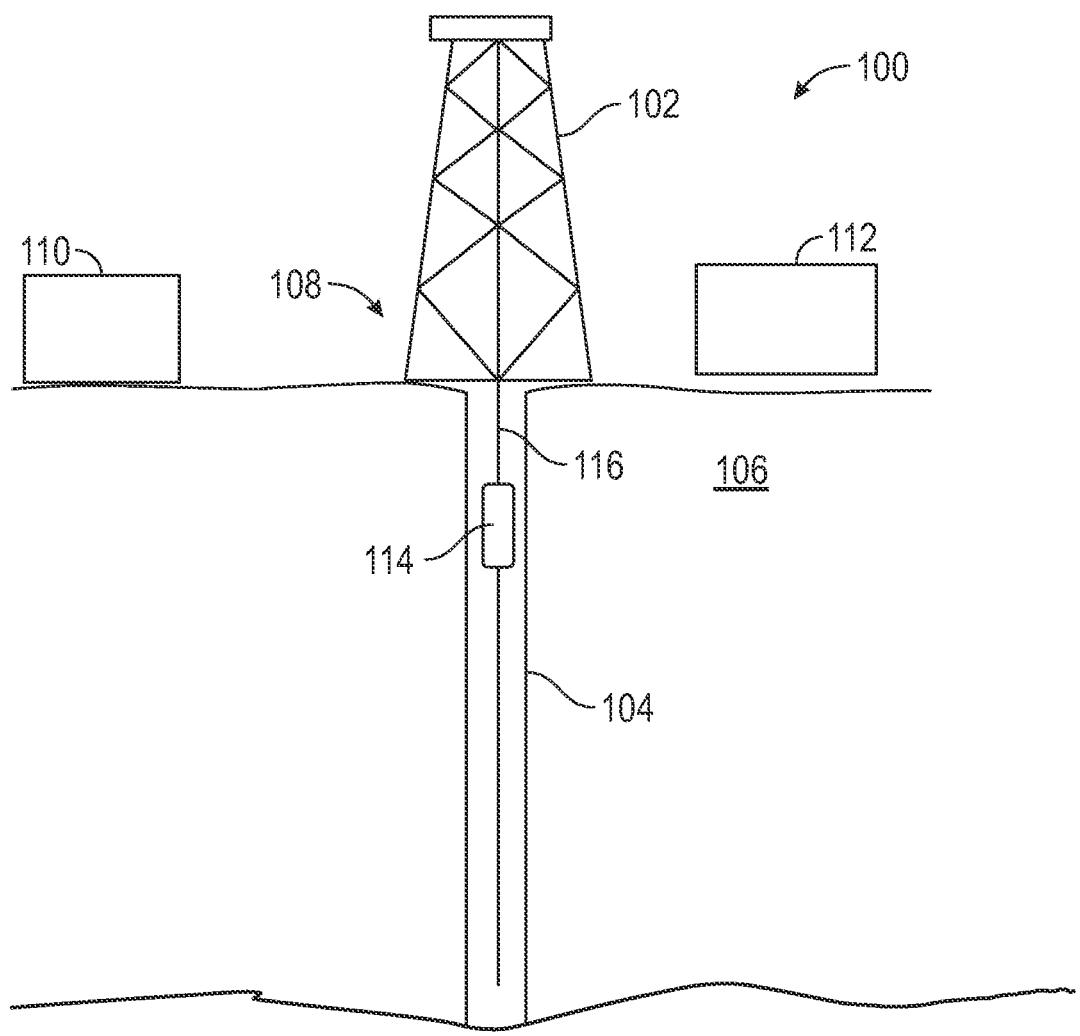
FIG. 1 illustrates a well environment according in accordance with one or more embodiments of the present disclosure.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-7, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "an injection system" includes reference to one or more of such systems.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Embodiments disclosed herein include methods and systems for sequestering carbon dioxide ($CO_2$) underground in the form of gas hydrates. Gas hydrates are compounds in which gas molecules are trapped within a crystal structure. Sequestering of $CO_2$ in the subsurface by forming a gas hydrate in the porous media has significant advantages in terms of storing $CO_2$ in a reservoir.

FIG. 1 illustrates an exemplary well environment 100 that may include a well 102 having a wellbore 104 extending into a geological formation 106, such as a saline reservoir, an aquifer, or a methane hydrate reservoir. The wellbore 104 may include a borehole that extends from the surface into a target zone of the formation 106, such as a reservoir. The well environment 100 may include an injection system 108, a control system 110, and a logging system 112. The injection system 108 may include a compressor, an ejector, an electric motor, a cooler, and a pump, and any other components necessary for injecting a fluid into the wellbore 104.

$CO_2$ may be captured as a gas and then compressed into a supercritical fluid before injection. The $CO_2$ fluid may be transferred from a source to an injection site of a well 102 via a pipeline or other transportation method. The $CO_2$ may be injected into a wellbore 104 using an existing well infrastructure. Generally, injected $CO_2$ travels through pore spaces, or perforations, of a formation 106 and is sequestered in the form of $CO_2$ gas hydrates or mixed $CO_2/CO_4$ gas hydrates. A portion of the injected $CO_2$ may be sequestered, or stored, in the formation 106. To cause injected $CO_2$ to migrate deeper into the reservoirs for more stable, permanent storage, it may be desirable to keep areas near the wellbore 104 free from gas hydrates.

Figure 6:
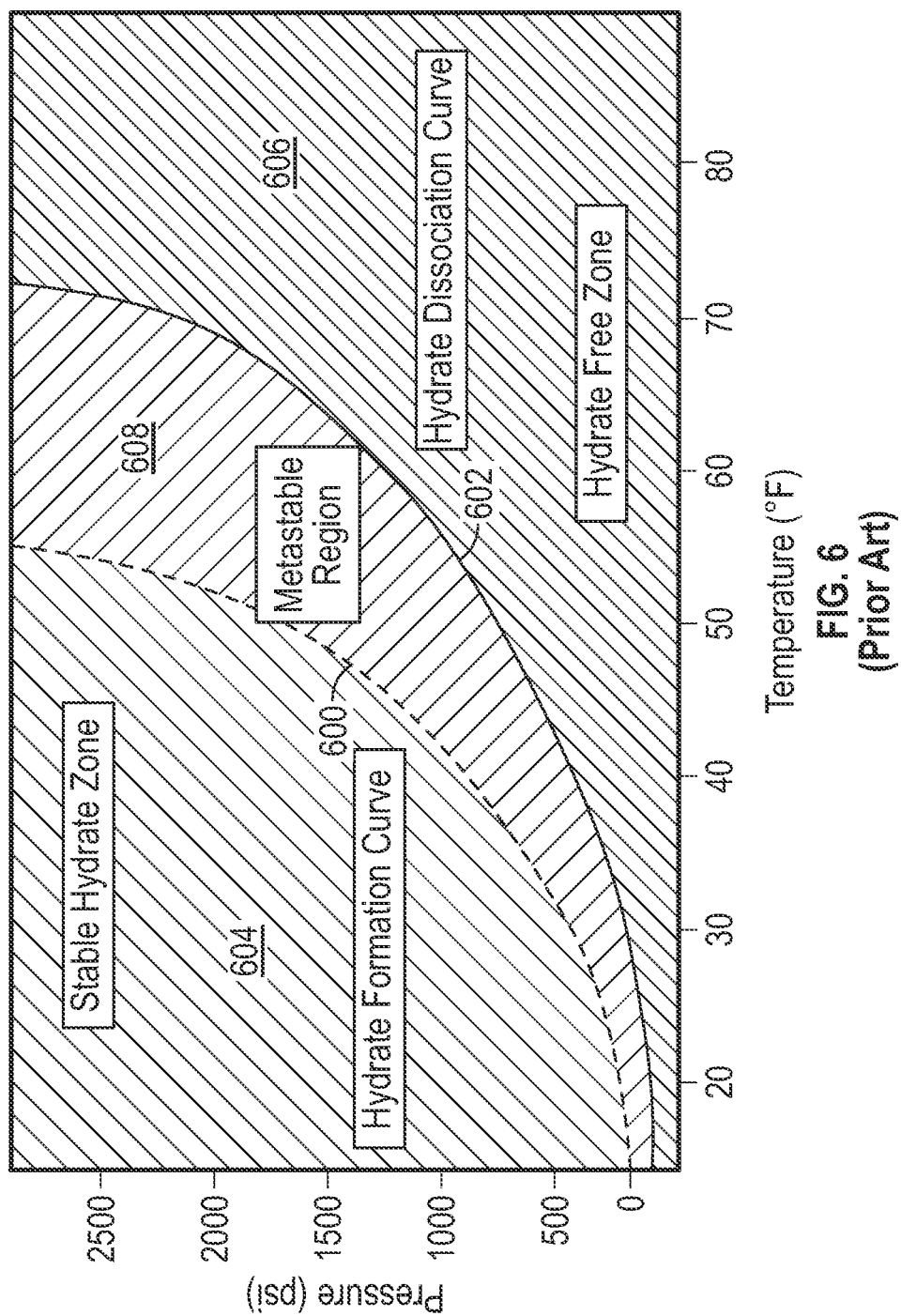
FIG. 6 illustrates a phase diagram of carbon dioxide hydrate according to prior art.

Gas hydrates typically form at temperatures below 5° C. and at pressures in the range of 30 bar to 43 bar. In some situations, when pressure is higher than the typical range, the temperature for gas hydrate formation may increase, such as up to 15° C., as shown in FIG. 6. Dissociation of gas hydrates near the wellbore 104 may be achieved by heating the $CO_2$ downhole, using a heating assembly 114 positioned within the wellbore 104, to a temperature sufficient to cause dissociation of gas hydrates. When temperatures rise, $CO_2$ molecules and $CH_4$ molecules in gas hydrates are trapped by water molecules. The hydrogen bonding between water molecules is broken, and gas hydrates destabilize.

In one or more embodiments, the lower limit temperature for destabilizing gas hydrates is approximately 27° C., such that gas hydrates are destabilized at or above 27° C. To account for potential heat losses in the wellbore 104 and reservoir, the injected $CO_2$ may be heated by the heating assembly 114 to a predetermined temperature, such as between 100° C. and 200° C., to achieve destabilization of the gas hydrate near the wellbore 104. In order to ensure that the $CO_2$ leaving the heater is at least 100° C., the heating assembly 114 temperature may be set to a value above 100° C. In one or more embodiments, the heating assembly 114 may be lowered into the wellbore 104 via a wire, a cable, or mounted on a reel. The heating assembly 114 may be an inline, in-well, or wireline low carbon intensity heater. Furthermore, the heating assembly 114 may be a single heating assembly or a series of heating assemblies.

In one or more embodiments, to maintain injectivity of the $CO_2$ in the gas hydrate reservoir, a continuous output of heat from the heating assembly 114 may be needed to keep gas hydrates near the wellbore 104 in a state of destabilization. A heat front produced by the heating assembly 114 near the wellbore 104 may be monitored via one or more temperature sensors within the wellbore. When heat plume growth is detected a sufficient distance away from the wellbore 104, such as two to five feet, then a determination may be made to turn off the heating assembly 114. As conditions are monitored, the heating assembly 114 may be turned back on as needed, such as when the temperature near the wellbore 104 decreases to below a predetermined threshold value. By maintaining sufficiently high temperatures of $CO_2$ near the wellbore 104, gas hydrates may be destabilized and $CO_2$ injectivity may be maintained.

Heating the $CO_2$ downhole serves to enhance the injectivity of the $CO_2$ as well as avoid formation of gas hydrates inside the wellbore 104 that may impact the flow inside the wellbore 104. Since gas hydrates may be prevented from forming in the wellbore 104 due to the high temperatures created and maintained by the heating assembly 114, the $CO_2$ is allowed to migrate deeper into the reservoir to form gas hydrates for more stable, permanent storage. The heated $CO_2$ will travel from high pressure near the wellbore 104 to low pressure deeper in the reservoir. In one or more embodiments, a $CO_2$ front, or plume, in the reservoir may be mapped using various monitoring and surveillance technologies, such as seismic, electrical, gravity, and/or deep electromagnetic measurements, and/or using downhole $CO_2$ detection tools, such as $CO_2$ meters, positioned within or near the wellbore 104 and geological formation 106.

The logging system 112 may include one or more logging tools on the end of a wireline for use in generating well logs of the formation. For example, a logging tool may be lowered into the wellbore 104 to acquire measurements as the tool traverses a depth interval of the wellbore 104. The plot of the logging measurements versus depth may be referred to as a "log" or "well log". Well logs may provide depth measurements of the well 102 that describe such reservoir characteristics as pressure formation porosity, formation permeability, resistivity, density, water saturation, and the like. Additional logging measurements may include flow rate, fluid composition, viscosity, temperature, and pressure. The measurements may be obtained using one or more types of sensors for sensing downhole parameters. Non-limiting examples of sensors that may be utilized include temperature sensors, pressure sensors, flow sensors, resistivity sensors, and acoustic sensors.

The resulting logging measurements may be stored and/or processed, for example, by the control system 110, to generate corresponding well logs for the well 102. For example, the control system 110 may receive logging measurements wirelessly from one or more sensors disposed in the well 102. Furthermore, the logging measurements may be used to guide decision making that is then implemented manually. For instance, logging measurements obtained from one or more temperature sensors within the well 102 may indicate that the heating assembly 114 is not sufficiently heating the $CO_2$ within the well 102 to prevent formation of gas hydrates. The logging measurements may indicate a problem with the heating assembly 114, a need for a temperature adjustment (e.g., increase of temperature), or a need for an additional heating assembly 114 to be lowered via the wireline into the wellbore.

The control system 110 may include hardware and/or software for managing operations, such as heating, injection, and/or monitoring operations. The control system 110 may be located at the surface near the well 102 in wired or wireless connection with one or more components within the well 102. The control system may include one or more programmable logic controllers (PLCs) that include hardware and/or software with functionality to control one or more processes performed by the injection system 108. Specifically, a programmable logic controller may control temperature adjustments, valve states, fluid levels, pipe pressures, warning alarms, and/or pressure releases within the well 102. In particular, a programmable logic controller may be a ruggedized computer system with functionality to withstand vibrations, extreme temperatures, wet conditions, and/or dusty conditions, for example, around a drilling rig.

Without loss of generality, the term "control system" may refer to an injection control system that is used to operate and control the equipment (e.g., hydraulic pumps, electric submersible pumps, compressors, bypass valves), a monitoring system (e.g., $CO_2$ monitors) that is used to acquire injection process and equipment data and to monitor the operation of the injection process, and/or an injection interpretation software system that is used to analyze and understand injection events and progress. In some embodiments, the control system 110 includes a computer system that is the same as or similar to that of computer 700 described below in FIG. 7 and the accompanying description. While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 2:
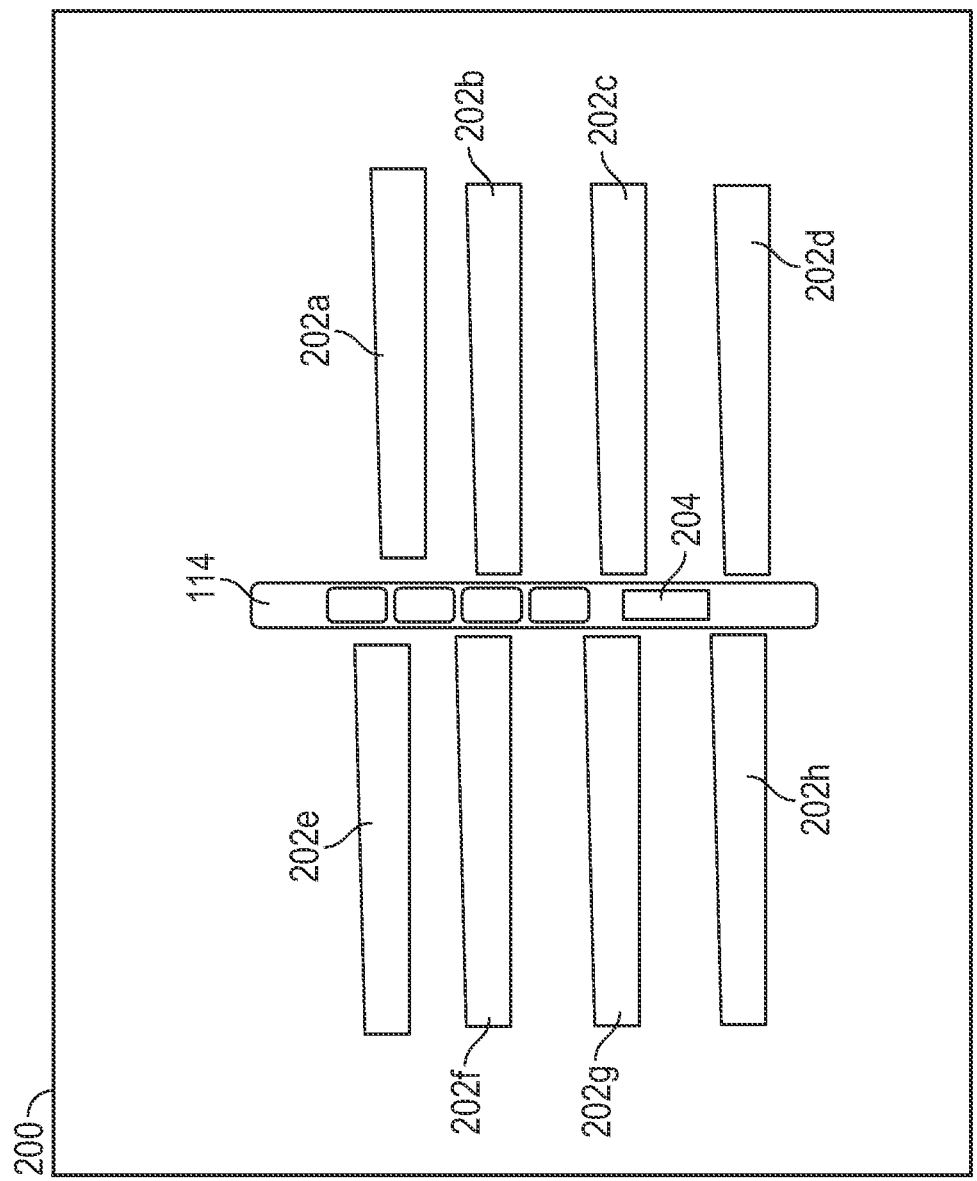
FIG. 2 illustrates a wireline heating assembly in accordance with one or more embodiments of the present disclosure.
Figure 3:
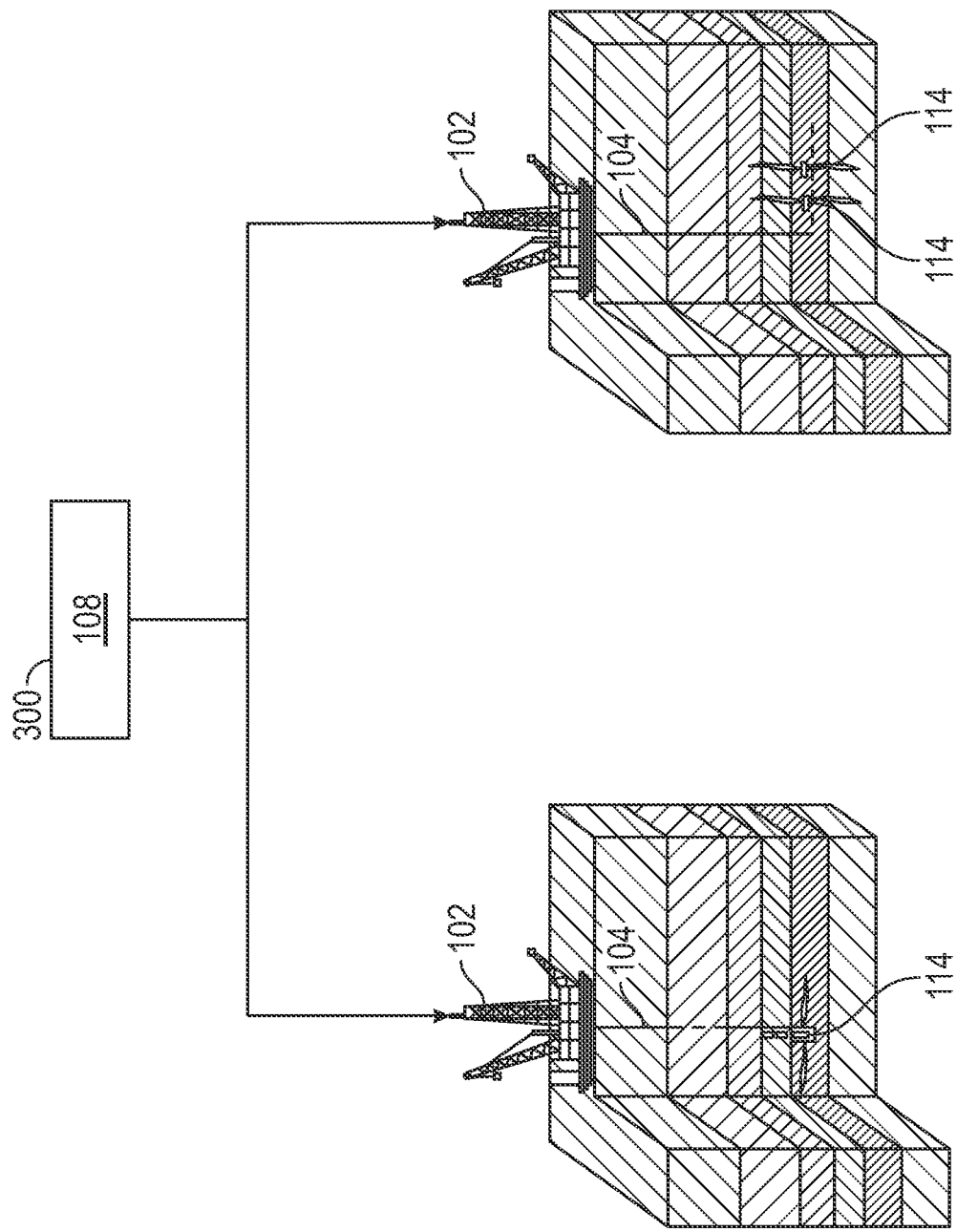
FIG. 3A illustrates a wireline heating assembly positioned in a vertical wellbore in accordance with one or more embodiments of the present disclosure.
FIG. 3B illustrates a wireline heating assembly positioned in a horizontal wellbore in accordance with one or more embodiments of the present disclosure.

FIG. 2 depicts the heating assembly 114 according to one or more embodiments of the present disclosure within a hydrate zone 200 of the geological formation. The hydrate zone 200 is a region of the formation where gas hydrates, such as methane gas hydrates, naturally exist. High temperature $CO_2$ is produced when $CO_2$ passes around or through the one or more heating assemblies 114. A temperature front may be produced, creating a plurality of temporary hydrate destabilization zones 202a, 202b, 202c, 202d, 202e, 202f, 202g, and 202h near the wellbore 104 due to dissociation of the gas hydrates. The heating assembly 114 may include a plurality of connected components including, but not limited to, centralizers for maintaining casing standoff, a motor (e.g., permanent magnet motor), one or more gauges to assist in real-time temperature control, and a heating element 204. The heating assembly 114 may be of any type including, but not limited to, a mechanical heater, an electric heater, a microwave heater, or electromagnetic heater. In one or more embodiments, the heating assembly 114 is a mechanical heater operated using mechanical friction. In one or more embodiments, components of the heating assembly 114 are substantially aligned with one another such that the heating assembly 114 forms an elongated structure, as shown in FIG. 2.

The heating assembly 114 may be lowered downhole by tubing 116, such as coiled tubing or production tubing. For instance, the heating assembly 114 may be installed and retrieved through production tubing. Additionally, the heating assembly 114 may be adjusted or controlled remotely from the surface by the control system 110. Alternatively, the heating assembly 114 may be brought to the surface for manual adjustments.

The heating assembly 114 described herein may be installed in both vertical wellbores and horizontal wellbores. FIGS. 3A and 3B depict the heating assembly 114 positioned in a vertical wellbore 104 of a well 102 and a horizontal wellbore 104 of a well 102, respectively. The injection system 108 is configured to receive pure or impure $CO_2$ 300, compress the $CO_2$ with one or more compressors of the injection system 108, and inject the compressed $CO_2$ into the wellbore 104. More than one heating assembly 114 may be installed within a wellbore 104, as shown in FIG. 3B.

Figure 4:
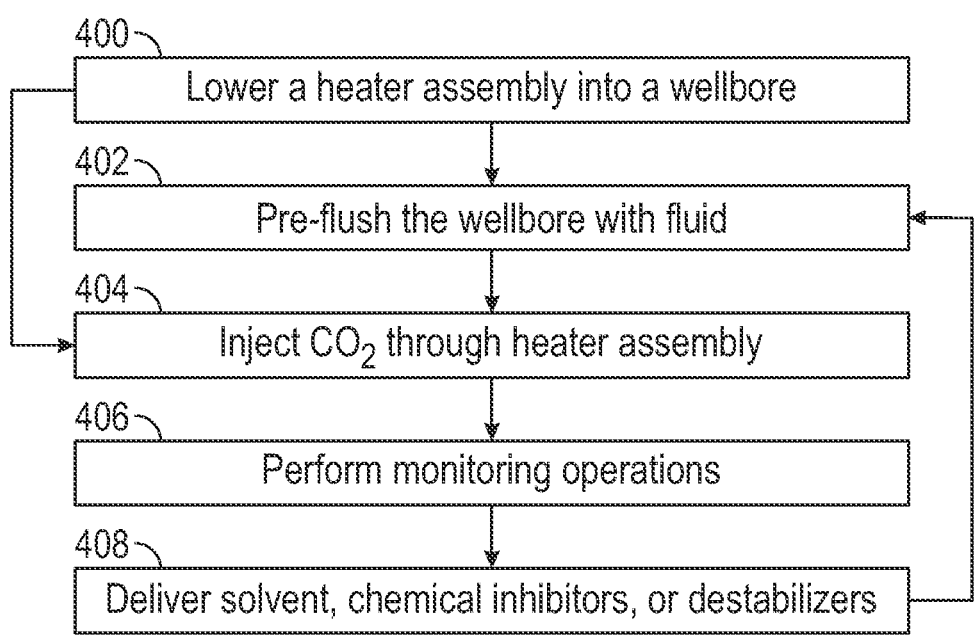
FIG. 4 is a flow diagram illustrating a method for downhole sequestration of carbon dioxide in accordance with one or more embodiments of the present disclosure.

FIG. 4 is a flow diagram depicting a method for downhole sequestration of $CO_2$ according to one or more embodiments of the present disclosure. In step 400, one or more heater assemblies are lowered into a wellbore. The one or more heating assemblies may be lowered at a distance such that the one or more heating assemblies are near perforations in the wellbore. The heater may be placed above well perforations in such a way that $CO_2$ injection fluid passes through or around the heating assembly before reaching the well perforations. In one or more embodiments, the heating assembly is at least 5 feet above well perforations. Alternatively, the heating assembly may be at least 10 feet or at least 20 feet above well perforations. Based on the range of pressures and temperatures along the wellbore, multiple heating assemblies may be lowered into the wellbore to produce a temperature sufficient to avoid gas hydrate formation inside the wellbore. The rate of injection of the well may be used to determine how many heater assemblies are needed. For example, when the injection rate is comparatively high, two or three heating assemblies in series may be needed. In one or more embodiments, the target temperature for the injected $CO_2$ is approximately 100° C. Therefore, the number of heating assemblies needed may be determined by the number needed to achieve the target temperature.

In one or more embodiments, a flush of hot fluid, such as water, may be injected into the wellbore in step 402 prior to injection of $CO_2$ in step 404. The fluid is heated downhole by passing through, or around, the one or more heating assemblies. For instance, when the injectivity of the $CO_2$ is comparatively low, a flush of hot water may be needed.

Since water has a high heat capacity, efficient heat transfer using hot water may be performed to destabilize the gas hydrates. In one or more embodiments, the temperature of the hot water is between 120° C. and 200° C. so that an injectivity gain is achieved by destabilizing the gas hydrates. The volume of hot water injected may be any volume needed to offer initial injectivity to the $CO_2$. For the purposes of this disclosure, injectivity is a qualitative parameter that may be used to predict the formation and/or disassociation of gas hydrates.

In step 404, $CO_2$ is injected through, or around, the one or more heater assemblies to heat the $CO_2$ to a temperature of up to 200° C., such as between about 100° C. and about 200° C. In one or more embodiments, the $CO_2$ injection fluid has a water/$CO_2$ ratio of 0.5 to 4.0 volumes of water per volume of $CO_2$ at reservoir conditions. Following injection of the $CO_2$, monitoring operations may be performed in step 406. The monitoring operations may include monitoring injectivity characteristics of the $CO_2$, such as pressure and flow, using pressure and flow meters/sensors located near or in the wellbore and geological formation. Additionally, the temperature of the $CO_2$ and wellbore may be measured and evaluated using temperatures sensors positioned near or in the wellbore and geological formation. Dissociation of the gas hydrates near the wellbore may be monitored to avoid formation of gas hydrates in the wellbore and near the wellbore. For instance, gas hydrates form and dissociate at particular temperatures and pressures (as shown in FIG. 6). By continuously measuring and monitoring temperature and pressure conditions, via a variety of different sensors, meters, and gauges, within and near the wellbore, formation and dissociation of gas hydrates may be assessed and estimated.

In addition to delivering $CO_2$ to the wellbore, the injection system may be configured to deliver solvents, chemical-based inhibitors, or destabilizers in step 408, either simultaneously or separately from the $CO_2$, to enhance the destabilization of the gas hydrates. Injection rate, or injectivity, is a condition that may be measured and monitored continuously. Injectivity measures the ability to insert a fluid into a geological formation. It may also be characterized by the ability of $CO_2$ to migrate from the injection well. When low injectivity is observed, indicating that gas hydrates are not being destabilized, gas hydrate inhibitors may be added to the reservoir. Furthermore, low injectivity may indicate that a particular reservoir is not suitable for $CO_2$ sequestration and storage. In one or more embodiments, if injectivity improvement after hot $CO_2$ injection is not observed after a duration of time (e.g., 30 days), the reservoir may be abandoned. For the purposes of this disclosure, injectivity is a qualitative parameter that may be used to assess whether the heat and/or solvents, inhibitors, and destabilizers are effectively preventing formation of gas hydrates within and near the wellbore.

In one or more embodiments, thermodynamic hydrate inhibitors or kinetic hydrate inhibitors may be injected with the hot water injection as a pre-flush treatment to improve injectivity in the reservoir. Thermodynamic hydrate inhibitors function by reducing the temperature and/or increasing the pressure at which the gas hydrates are stable. The thermodynamic hydrate inhibitors may be injected at a concentration of 30% to 60% by volume in water. Kinetic hydrate inhibitors are water soluble polymers with many amphiphilic groups, usually made up of amide groups and adjacent hydrophobic groups with 3-6 carbon atoms. The mechanism of action of kinetic hydrate inhibitors is to incorporate into growing gas hydrate crystals, thereby disrupting further hydrate crystal growth. The kinetic hydrate inhibitors may be added at a concentration of up to 3% by volume in water. Additionally, some thermodynamic inhibitors, such as methanol and ethylene glycol may be used as inhibitors for gas hydrate formation. Non-limiting examples of solvents that may be utilized to inhibit gas hydrate formation include aqueous monoalcohols, oxygenated monoalcohols, and polyglycols.

Figure 5:
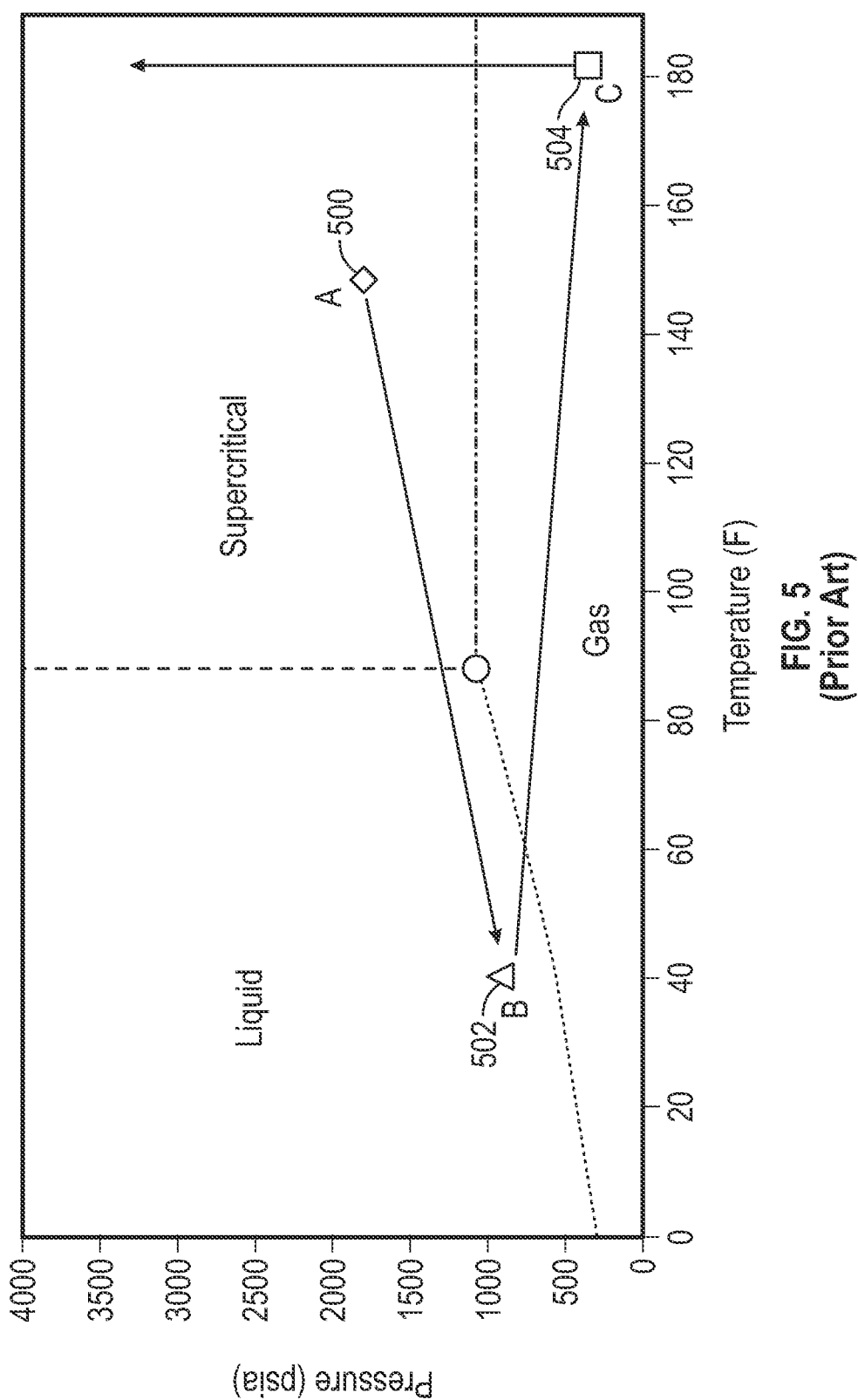
FIG. 5 illustrates the gas, liquid, and supercritical states of carbon dioxide as a function of pressure and temperature according to prior art.

FIG. 5 illustrates the gas, liquid, and supercritical phases of $CO_2$ as a function of pressure and temperature. Point A 500 is in the supercritical phase, which includes values associated with both higher temperatures and higher pressures. Point B 502 represents the liquid phase of $CO_2$ with lower temperatures and lower pressures. Point C 504 represents the gas phase of $CO_2$ with higher temperatures and lower pressures. Thus, to form $CO_2$ gas hydrates deep within the reservoir, the $CO_2$ needs to stay within a particular temperature and pressure range. The heating assembly according to one or more embodiments of the present disclosure functions to create and maintain a given temperature of the $CO_2$ within the wellbore.

FIG. 6 illustrates the phase envelope of $CO_2$ gas hydrate as a function of pressure and temperature. Curve 600 is a hydrate formation curve representing exemplary temperatures and pressures at which hydrates are formed. Curve 602 is a hydrate dissociation curve representing exemplary temperatures and pressures at which hydrates dissociate. The area 604 above curve 600 represents a stable hydrate zone. The area 606 below curve 602 represents a hydrate free zone. The area 608 between curves 600 and 602 represents a metastable region. In one or more embodiments, formation and/or disassociation of gas hydrates within the wellbore and surrounding areas may be estimated, or predicted, using, for instance, phase envelope data, in order to determine whether the heating assembly is functioning properly and/or if adjustments need to be made to the heating assembly.

Figure 7:
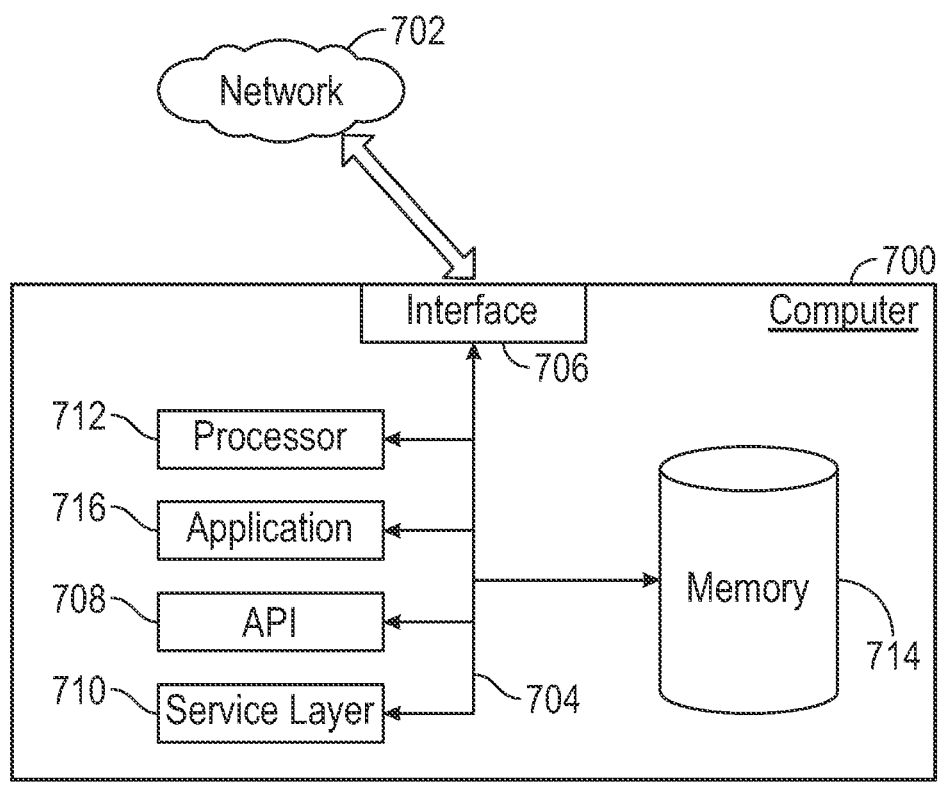
FIG. 7 illustrates a computing system in accordance with one or more embodiments of the present disclosure.

FIG. 7 further depicts a block diagram of a computer 700 used to provide computational functionalities associated with described analysis, methods, functions, processes, flows, and procedures as described in this disclosure, according to one or more embodiments. The illustrated computer 700 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 700 may include an input device, such as a keypad, keyboard, touch screen, or other device that can accept user information, and an output device that conveys information associated with the operation of the computer 700, including digital data, visual, or audio information (or a combination of information), or a GUI.

The computer 700 can serve in a role as a client, network component, a server, a database or other persistency, or any other component (or a combination of roles) of a computer system for performing the subject matter described in the instant disclosure. The illustrated computer 700 is communicably coupled with a network 702. In some implementations, one or more components of the computer 700 may be configured to operate within environments, including cloud-computing-based, local, global, or other environment (or a combination of environments).

At a high level, the computer 700 is an electronic computing device operable to receive, transmit, process, store, or manage data and information associated with the described subject matter. According to some implementations, the computer 700 may also include or be communicably coupled with an application server, e-mail server, web server, caching server, streaming data server, business intelligence (BI) server, or other server (or a combination of servers).

The computer 700 can receive requests over network 702 from a client application (for example, executing on another computer 700) and responding to the received requests by processing the said requests in an appropriate software application. In addition, requests may also be sent to the computer 700 from internal users (for example, from a command console or by other appropriate access method), external or third-parties, other automated applications, as well as any other appropriate entities, individuals, systems, or computers.

Each of the components of the computer 700 can communicate using a system bus 704. In some implementations, any or all of the components of the computer 700, both hardware or software (or a combination of hardware and software), may interface with each other or an interface 706 (or a combination of both) over the system bus 704 using an application programming interface (API) 708 or a service layer 710 (or a combination of the API 708 and service layer 710). The API 708 may include specifications for routines, data structures, and object classes. The API 708 may be either computer-language independent or dependent and refer to a complete interface, a single function, or even a set of APIs. The service layer 710 provides software services to the computer 700 or other components (whether or not illustrated) that are communicably coupled to the computer 700. The functionality of the computer 700 may be accessible for all service consumers using this service layer. Software services, such as those provided by the service layer 710, provide reusable, defined business functionalities through a defined interface. For example, the interface may be software written in JAVA, C++, or other suitable language providing data in extensible markup language (XML) format or another suitable format. While illustrated as an integrated component of the computer 700, alternative implementations may illustrate the API 708 or the service layer 710 as stand-alone components in relation to other components of the computer 700 or other components (whether or not illustrated) that are communicably coupled to the computer 700. Moreover, any or all parts of the API 708 or the service layer 710 may be implemented as child or sub-modules of another software module, enterprise application, or hardware module without departing from the scope of this disclosure.

The computer 700 includes an interface 706. Although illustrated as a single interface 706 in FIG. 7, two or more interfaces 706 may be used according to particular needs, desires, or particular implementations of the computer 700. The interface 706 is used by the computer 700 for communicating with other systems in a distributed environment that are connected to the network 702. Generally, the interface 706 includes logic encoded in software or hardware (or a combination of software and hardware) and operable to communicate with the network 702. More specifically, the interface 706 may include software supporting one or more communication protocols associated with communications such that the network 702 or interface's hardware is operable to communicate physical signals within and outside of the illustrated computer 700.

The computer 700 includes at least one computer processor 712. Although illustrated as a single computer processor 712 in FIG. 7, two or more processors may be used according to particular needs, desires, or particular implementations of the computer 700. Generally, the computer processor 712 executes instructions and manipulates data to perform the operations of the computer 700 and any algorithms, methods, functions, processes, flows, and procedures as described in the instant disclosure.

The computer 700 also includes a memory 714 that holds data for the computer 700 or other components (or a combination of both) that can be connected to the network 702. For example, memory 714 can be a database storing data consistent with this disclosure. Although illustrated as a single memory 714 in FIG. 7, two or more memories may be used according to particular needs, desires, or particular implementations of the computer 700 and the described functionality. While memory 714 is illustrated as an integral component of the computer 700, in alternative implementations, memory 714 can be external to the computer 700.

The application 716 is an algorithmic software engine providing functionality according to particular needs, desires, or particular implementations of the computer 700, particularly with respect to functionality described in this disclosure. For example, the application 716 can serve as one or more components, modules, applications, etc. Further, although illustrated as a single application 716, the application 716 may be implemented as multiple applications 716 on the computer 700. In addition, although illustrated as integral to the computer 700, in alternative implementations, the application 716 can be external to the computer 700.

There may be any number of computers 700 associated with, or external to, a computer system containing computer 700, wherein each computer 700 communicates over network 702. Further, the term "client," "user," and other appropriate terminology may be used interchangeably as appropriate without departing from the scope of this disclosure. Moreover, this disclosure contemplates that many users may use one computer 700, or that one user may use multiple computers 700.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed:

1. A method for downhole sequestration of carbon dioxide, comprising:
   lowering at least one heating assembly into a wellbore within a geological formation;
   injecting carbon dioxide into the wellbore;
   heating the injected carbon dioxide to a predetermined temperature using the at least one heating assembly;
   allowing the heated carbon dioxide to migrate from the wellbore into the geological formation for permanent storage;
   performing at least one monitoring operation to detect the formation of gas hydrates within the wellbore; and
   wherein when formation of gas hydrates is detected in the wellbore, increasing a temperature within the wellbore using the at least one heating assembly.

2. The method of claim 1, comprising injecting a heated fluid into the wellbore prior to injecting the carbon dioxide, wherein the heated fluid is heated by the at least one heating assembly.

3. The method of claim 2, wherein the heated fluid is water.

4. The method of claim 1, wherein the predetermined temperature ranges from about 100° C. to about 200° C.

5. The method of claim 1, further comprising injecting at least one hydrate inhibitor into the wellbore.

6. The method of claim 5, wherein the at least one hydrate inhibitor is at least one of a thermodynamic hydrate inhibitor and a kinetic hydrate inhibitor.

7. The method of claim 1, further comprising injecting at least one solvent into the wellbore.

8. The method of claim 7, wherein the at least one solvent is at least one of an aqueous monoalcohol, an oxygenated monoalcohol, and a polyglycol.

9. The method of claim 1, comprising monitoring dissociation of gas hydrates within the wellbore.

10. The method of claim 1, comprising creating a plurality of temporary hydrate destabilization zones near the wellbore due to dissociation of gas hydrates.

11. The method of claim 1, comprising monitoring injectivity of the heated carbon dioxide into the geological formation.

12. The method of claim 1, wherein the at least one heating assembly is lowered near one or more perforations in the wellbore.

13. The method of claim 1, wherein the at least one heating assembly comprises a mechanical heating element.

14. The method of claim 1, comprising lowering at least one additional heating assembly into the wellbore.

15. The method of claim 1, comprising injecting heated water and a thermodynamic hydrate inhibitor into the wellbore prior to injecting the carbon dioxide.

16. The method of claim 1, comprising injecting heated water and a kinetic hydrate inhibitor into the wellbore prior to injecting the carbon dioxide.

* * * * *